United States Patent [19]
Crim

[11] Patent Number: 5,920,866
[45] Date of Patent: Jul. 6, 1999

[54] PROCESS AND SYSTEM FOR GENERATING SHARED VALUE LISTS FOR DATABASES

[75] Inventor: Christopher L. Crim, San Jose, Calif.

[73] Assignee: Apple Computer, Inc., Cupertino, Calif.

[21] Appl. No.: 08/739,451

[22] Filed: Oct. 29, 1996

[51] Int. Cl.[6] .................................................. G06F 17/30
[52] U.S. Cl. .......................... 707/100; 707/2; 707/102; 707/200; 707/526; 345/157; 345/347; 345/352
[58] Field of Search ............................. 707/200, 2, 526, 707/102, 100; 345/347, 157, 352

[56] References Cited

U.S. PATENT DOCUMENTS

| | | | |
|---|---|---|---|
| 5,263,126 | 11/1993 | Chang | 395/51 |
| 5,272,767 | 12/1993 | Asmuth et al. | 382/305 |
| 5,473,732 | 12/1995 | Chang | 395/77 |
| 5,530,854 | 6/1996 | Emery et al. | 707/100 |
| 5,608,898 | 3/1997 | Turpin et al. | 707/201 |
| 5,615,367 | 3/1997 | Bennett et al. | 707/102 |

OTHER PUBLICATIONS

Unknown, "Lotus Approach," 1996 Ed., Approach Software Corp., Mountain View, CA.

Laurent Ribardière, "4th Dimension Design Reference," ACI US, Inc., Cupertino, CA, and ACI, Paris, France, 1992, pp. 1–11.

Unknown, "Panorama Handbook, Version II," ProVUE Development, Huntington Beach, CA, Apr. 1991, pp. 23–24.

*Primary Examiner*—Wayne Amsbury
*Assistant Examiner*—Jean R. Homere
*Attorney, Agent, or Firm*—Beyer & Weaver, LLP

[57] ABSTRACT

Disclosed is a process and apparatus for generating value lists. The operations for generating a value list include providing a first database having a plurality of fields configured to display values that are associated with predefined information types. Preferably a second database having a plurality of fields containing values associated with predefined information types is also provided. Once the databases are provided, one of the plurality of fields in the first database is selected to be associated with a value list. The selected field will preferably have a particular information type, and the value list will preferably contain one or more values that are specific to the particular information type. The process then proceeds to define the value list to contain values from certain fields of the second database.

29 Claims, 22 Drawing Sheets

FIG. 1

![Invoice form diagram with labeled elements: ACME Accessories company info (12), Account # ACM1, Invoice Date 4/29/92 (14,16), Invoice # 101 (18); table with columns UNIT(S) (26), PART # (28), DESCRIPTION (30), $UNIT, $ (32); row showing 6, PR345, Deer Poster, 12.00, $72.00; additional part numbers PR345, PR234, PR29089, PR1101 (34); Subtotal $72.00, Tax $8.00, Total $80.00; overall form (10)]

Court Docket — 302

| Case # | Plaintiff | Plaintiff's Attorney | Defendant | Defendant's Attorney |
|--------|-----------|----------------------|-----------|----------------------|
| CV-157 | Paul | | Joe | |
| Matter: Dog Bite | | | | |
| CV-154 | Bob | Peggy | Clay | Lee |
| Matter: Slip & fall | | | | |
| CV-155 | Greg | | Kathy | |
| Matter: Copyright | | | | |
| CV-156 | Doug | | Al | |
| Matter: Patent | | | | |

- 304 Case #
- 306 Plaintiff
- 308 Plaintiff's Attorney
- 310 Defendant
- 312 Defendant's Attorney
- 314
- 316 Browser
- 318 Find
- 320 Layout
- 322 Preview

FIG. 3

|       | 304 | 314 306 | 308 | 310 | 312 |
|---|---|---|---|---|---|
| Case # | Plaintiff | Plaintiff's Attorney | Defendant | | Defendant's Attorney |
| CV-154 | Bob | Peggy | Clay | | Lee |
| Matter | Slip & fall | | | | |
| CV-155 | Greg | | Kathy | | |
| Matter | Copyright | | | | |
| CV-158 | Dog bite | | | | |
| | Copyright | | | | |
| Matter | Patent Infringement | —704 | | | |
| | Trademark Infringement | | | | |
| CV-15 | Unfair Competition | | | | |
| Matter | Insurance Fraud | | | | |
| 705 — | Edit | | | | |

| Case# | Plaintiff | | Plaintiff's Attorney | Defendant | Defendant's Attorney |
|---|---|---|---|---|---|
| CV-154 | Bob | | Peggy | Clay | Lee |
| Matter | Slip & fall | | | | |
| CV-155 | Greg | | | Kathy | |
| Matter | Copyright | | | | |

Copyright
Patent Infringement
Trademark Infringement — 704
Unfair Competition
Insurance Fraud
Contract — 711

Edit... — 705

PROCESS AND SYSTEM FOR GENERATING SHARED VALUE LISTS FOR DATABASES

BACKGROUND OF THE INVENTION

1. Field of the Invention

The present invention relates generally to value lists used with databases to facilitate data entry, and more particularly, to an improved process and system for generating and editing value lists used with databases.

2. Description of the Related Art

Early database software programs were a great relief for people who needed to organize and store vast amounts of data. Thus, databases allowed people to input and store information in a form which could be easily re-called and updated. As is well known in the art, database programs are no longer only used in business settings, but have gained tremendous acceptance and usage by families and students. By way of example, families have used database programs to keep medical records, keep a budget, maintain an inventory of assets, and compile wedding plan information. Similarly, students may use a database program to maintain student loan records, prioritize class events, and coordinate field trips.

Generally, database programs have gained increased acceptance by the computing public with the advent of more user friendly database programs which have made data entry more efficient. Although there have been great improvements in database software programs, there is still a great need for database programs that reduce the hassles associated with repetitively entering frequently used information from scratch each time the information is needed for a particular database field. To solve this problem, database software programs have incorporated "value lists." In general, value lists are a series of frequently used values such as, e.g., text, numbers, dates and times that are presented to a user for selection during data entry.

In operation, when a database designer wants a particular field in a database to have only certain types of values, a custom value list can be created for that field. In this manner, when the user selects a field that has a previously assigned value list, the user will be presented with a custom value list from which to make a selection for entry. As can be appreciated, when database fields have assigned value lists, more control is maintained over the particular values that can be entered into a particular field. Further, data entry is made more efficient because users need only make a choice from the value list, instead of having to enter information from scratch at the risk of introducing mistakes or typographical errors.

FIG. 1 shows an invoice database 10 having a number of fields used to record customer information and itemize purchases. A number of standard customer information fields 12 show where the customer's name and address is input. Also shown is an account number field 14, an invoice date field 16, an invoice number field 18, a units field 26, a part number field 28, a description field 30, and a calculation field 32. In this example, a value list 34 is shown being assigned to part number field 28. Therefore, when a user goes to enter a part number for the particular type of merchandise being sold, the user need only select the part number field 28, and a pop-up list 34 appears displaying a plurality of part choices. At this point, the user can select the appropriate part without having to enter it from scratch.

Although value lists that are assigned to a particular field have proven to be useful to maintain control over data entry by a user, the value lists are "field specific." That is, once a value list is created for a particular field, that value list conventionally cannot be shared by other fields in the same database or other databases. In the particular example illustrated in FIG. 1, value list 34 cannot be used with other fields in invoice database 10, other databases may find tremendous benefit in re-using value list 34 which was previously created for part number field 28. Unfortunately, a user will be required to laboriously re-create value list 34 each time the user wants to use the values in value list 34 for another field. In addition to being highly laborious, each time value list 34 is re-created, the possibility of introducing mistakes or typographical errors is increased. An even more taxing consequence is that when an up-date or change is made to the values in one value list, all occurrences of the same value list, whether they are in the same database or in another database must also be up-dated. As can be appreciated, this can potentially make maintaining frequently used database value lists extremely time consuming and counterproductive to the efficient utilization of value lists.

In addition to being unable to share existing value lists among fields in a database, when a value list is created, all of the values in the value list must be manually entered even though the values may already exist in other fields in the current database or another database. By way of example, the user of invoice database 10 may already have another database that already itemizes all of the currently available part numbers. However, the user is not able to create value list 34 based on the values in the another database having all of the currently available part numbers. Because the user is unable to base value list 34 on another database, the user will have to manually create values list 34 from scratch.

As mentioned above, manually creating numerous identical value lists can be extremely taxing and repetitive. This is especially true when updates or changes are required for all of the identical value lists. Further, when changes are made to a master database having field values used to create multiple value lists, each and every value list must also be updated. In addition, when a value list is updated, the database is typically inactivated while the change is being made. As can be appreciated, this would especially decrease user's productivity when a database is being accessed by multiple users over a network.

In view of the foregoing, what is needed is a process and system for generating value lists that may be shared between fields requiring the same values in the same database or in another database. There is also a need for a process and system for generating value lists that are based on values within fields of the same database or of another database.

SUMMARY OF THE INVENTION

Broadly speaking, the present invention fills these needs by providing a process and system for generating and editing value lists.

The invention can be implemented in numerous ways, including as a process, an apparatus, a system, a device, a method, or a computer readable medium. Several embodiments of the invention are discussed below.

In one embodiment, a process and system of present invention generally allows a user to take advantage of value lists to accurately enter data into fields of a database. In one embodiment, a user may create a value list having values that are selected from other fields. Preferably, the created value list is given an identifying name so that it may be shared by other fields in a current database or another database. Further, the value list may be configured to allow users to "edit" the value list while performing data entry. Advantageously, allowing users to edit existing value lists by adding, subtracting, and modifying values in a value list during data entry avoids having to bring down a database in order to perform an edit. This feature finds particular advantage when a database is being shared over a network, and down-times associated with bringing down a database to perform a value list edit can result in loss of productivity.

In another embodiment, a process for generating value lists is disclosed. The operations for generating a value list include providing a first database having a plurality of fields configured to display values that are associated with pre-defined information types. Preferably a second database having a plurality of fields containing values associated with predefined information types is also provided. Once the databases are provided, one of the plurality of fields in the first database is selected to be associated with a value list. The selected field will preferably have a particular information type, and the value list will preferably contain one or more values that are specific to the particular information type. The process then proceeds to define the value list to contain values from certain fields of the second database.

In yet another embodiment, a process for editing value lists shared among fields in one or more database is disclosed. The process includes the operation of providing a database having a plurality of fields and providing at least one or more value lists, each having a plurality of values. The process then proceeds to select at least one of the plurality of fields in the database to be associated with one of the value lists. The value list may then be edited while performing a data entry operation.

The advantages of the invention are numerous. One advantage of the invention is that when fields of a database are used to define the values of a value list, any future updates to the fields of the database will automatically update the values in the value lists based on the updated information.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1 shows an invoice database having a number of fields used to organize customer information and purchases.

FIG. 3 shows an exemplary court docket database used for docketing cases being tried before a particular court in accordance with a preferred embodiment of the invention.

FIGS. 7A through 7E illustrates the operations associated with performing edits to existing value lists while in data entry mode in accordance with a preferred embodiment of the present invention.

DETAILED DESCRIPTION OF THE PREFERRED EMBODIMENTS

The present invention discloses a process and system for generating value lists that may be shared by more than one field and may be generated based on the contents of other fields.

The process and system of the present invention generally allows a user to take advantage of value lists to efficiently enter data into databases. In one embodiment, a user may create a value list having custom values that are specific to a particular field. Preferably, the value list is given an identifying name so that it may be shared by other fields in a current database or another database. Further, the creator of the value list can optionally allow users to edit the value list while performing data entry. Advantageously, allowing users to edit existing value lists by adding, subtracting, and modifying the values in the value lists while in data entry mode avoids having to bring down a database in order to make the edit. This feature finds particular advantage when a database is being used over a network, and down-times associated with bringing down a network to perform a value list edit could result in loss of productivity.

In another embodiment, shared value lists having values based on a field find particular advantage in that up-dates to a field being used in a value list are automatically associated to the contents of the value list. In this manner, a user can update all value lists based on fields by simply updating the fields themselves. Therefore, once a value list that is based on fields is created and given an identifying name, it can be called by other fields in the current database or by fields in other databases. Advantageously, as described above, if field is updated, the value lists will automatically be updated without the need for laboriously updating each and very value list that makes use of a particular field.

Figure 2:
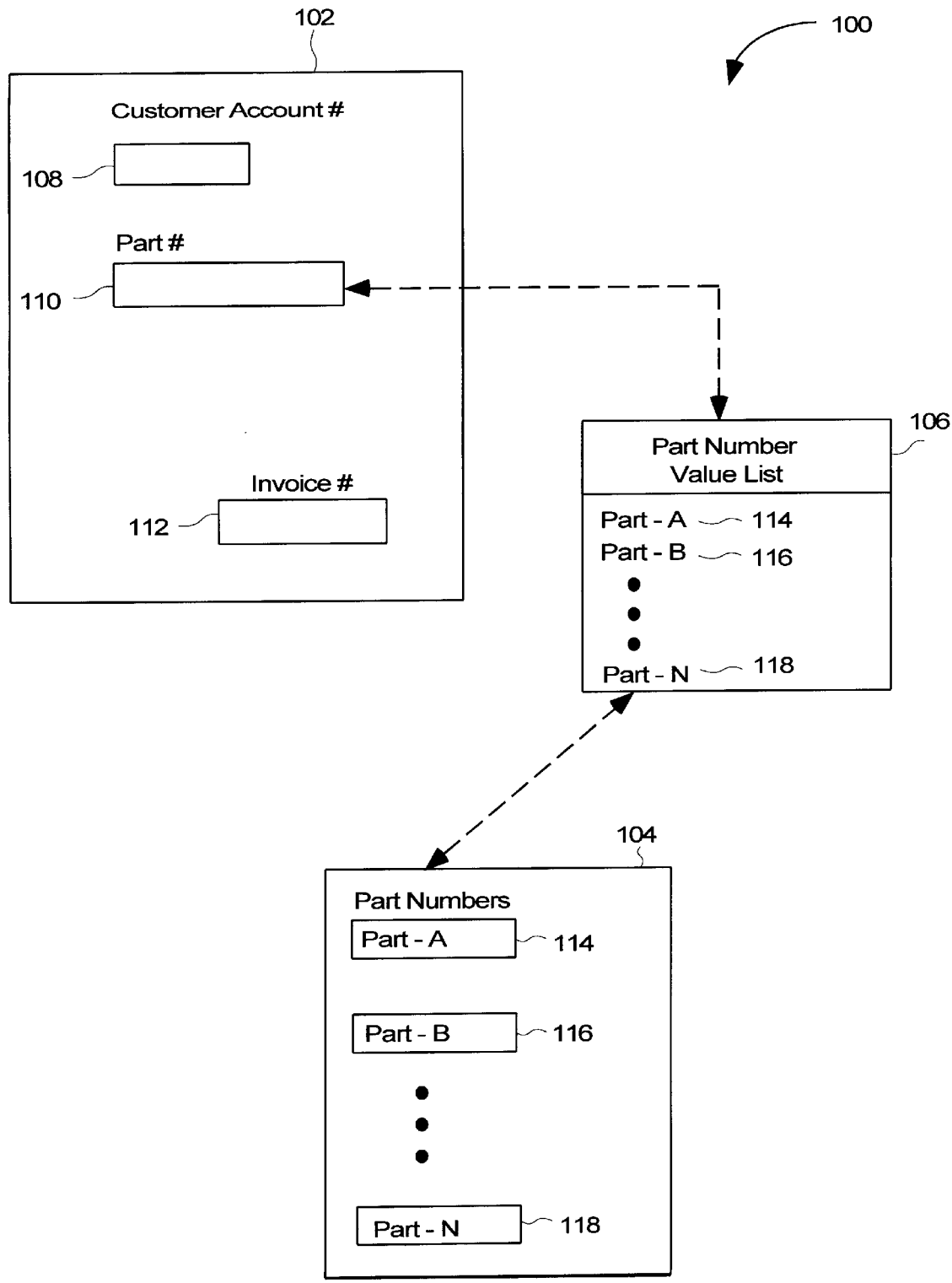
FIG. 2 is a block diagram of one database using a value list that has values based on fields of another database in accordance with a preferred embodiment of the invention.

FIG. 2 is a block diagram 100 of a first database 102 using a value list 106 having values based on fields of a second database 104. As in conventional databases, first database 102 typically has a number of custom fields 108, 110, and 112 that are set up to accept data that is specific to a user's needs. By way of example, custom fields 108, 110, and 112 may represent a customer account number, a part number, and an invoice number, respectively. Although the field information can be manually input each time a customer orders merchandise, the database user can create a value list for part number 110 by referencing fields in second database 102.

In this example, second database 102 is shown having a plurality of part number fields for PART-A 114, PART-B 116 and PART-N 118. Instead of manually entering the part number each time it is needed in field 110 of first database 102, the user can create value list 106 to be based on fields of second database 104. As shown, value list 106 has been assigned a custom name of "Part Number," and it contains a listing of part numbers PART-A 114, PART-B 116 and PART-N 118. Once created, value list 106 is made accessible to any other field that wants to use the part numbers of second database 104. In this manner, if an update is made to the available parts contained in second database 104, value list 106 will also be automatically updated to reflect any changes made to the part number fields. Furthermore, once value list 106 is created, it can be shared by any other field in a second database requiring the information in the part number value list. Of course, the value is first preferably defined in the second database before being used.

Although only part number field 110 in database 102 is shown being associated with value list 106 and second database 104, it should be understood that other fields such as customer account field 108 and invoice field 112 can either make use of a previously created value list based on other fields in database 102 or fields in other databases. Of course, a user can also create a custom value list for a particular field, and then subsequently make the contents of that value list available to other fields in data base 102 or fields in another database.

Referring now to FIG. 3, an exemplary court docket database 302 is shown representing a typical user interface configured to receive data for docketing cases being tried in a particular court. In this example, the created custom fields are represented as case number field 304, plaintiff field 306, plaintiff's attorney field 308, defendant field 310, defendant's attorney field, and matter field 314. In one case (CV-157), Paul is the plaintiff and Joe is the defendant. In this case, Paul has alleged in his complaint that Joe did not leash his dog and that Joe's dog attacked Paul when he was playing a round of golf. Therefore, matter field 314 shows that the cause of action is a strict liability "Dog bite" action.

During data entry, the database is preferably set in a "browse mode" 316 which allows the user to work with the data in the database. By way of example, in browse mode 316, a user may add, change, sort, omit and delete records.

To change the mode, the user may select browse mode 316 and a pop-up list appears showing a find mode 318, a layout mode 320 and a preview mode 322. In a find mode, the user may search for particular records that match a set of criteria. Once found, the user can work on those records, called the "found set." The user can then return to browse mode 316 and begin working with the found set. In a layout mode 320, the user determines how the information in the database is going to be presented during data entry and in the resulting printed reports. In one embodiment, the user may design the user interface to have certain graphics, icons and fields having explanatory titles to assist the user during data entry.

Further, in layout mode, the user may select particular fields and then create a value list for the selected field. As will be described in greater detail below, to create a value list for a particular field, while in layout mode, the user will select "format" from the main menu bar, and then select "field format." At this point, a user interface presents the user with options for creating a custom value list, or creating a value list based on fields. Once the user makes the appropriate selections, the selected field will be associated with the created value list. At this point, the user selects browse mode 316 to allow data entry to be performed using the created value list. Finally, in preview mode 322, the user is presented with a display of how the database will look once it is printed on paper.

In order to increase the court clerk's efficiency and accuracy when performing data entry, the creator of court docket database 302 may want to incorporate value lists for various fields. By way of example, the court may want to create a value list for plaintiff's attorney field 308 and defendant's attorney field 312. In accordance with one embodiment of this invention, an "attorneys value list" may be created based on the contents of another database. Advantageously, this court may already keep a separate database having detailed information about the attorneys licensed to practice before the court.

Figure 4:
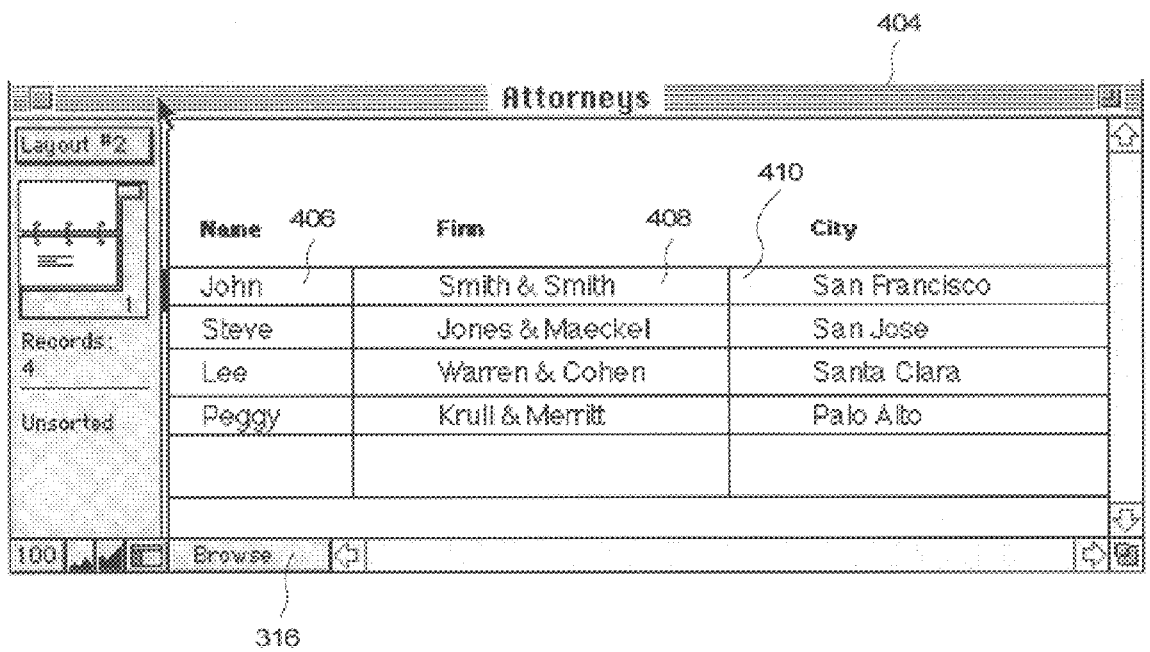
FIG. 4 shows an exemplary attorneys database used to store information on attorneys licensed to practice before a particular court in accordance with a preferred embodiment of the invention.

FIG. 4 is an exemplary attorneys database 404 representing a typical user interface configured to receive information on attorneys licensed to practice before the court. As shown, attorneys database 404 has a name field 406, a firm field 408 and a city field 410. As shown, this database is currently in browse mode 316 which allows the user (e.g., the court clerk) to update the information in the fields when an attorney changes firms and practice cities. Assuming that the court clerk continually updates attorneys database 404 such that each attorney's firm and city is current, then the court clerk can make use of this database when creating a value list for plaintiff's attorney field 308 and defendant's attorney field 312 of court docket database 302. Of course, if the value list is created for plaintiff's attorney field 308, the clerk need not re-create the value list from scratch if another field wants to use the value list.

By way of example, the court clerk need only select defendant's attorney field 312 and associate it the value list previously created for plaintiff's attorney field 308. Further, when updates are made to attorneys database 404, the value lists that were created based on the fields of attorneys database 404 will automatically be updated, thereby avoiding repetitive updates to each and every occurrence of the value list.

Figure 5A:
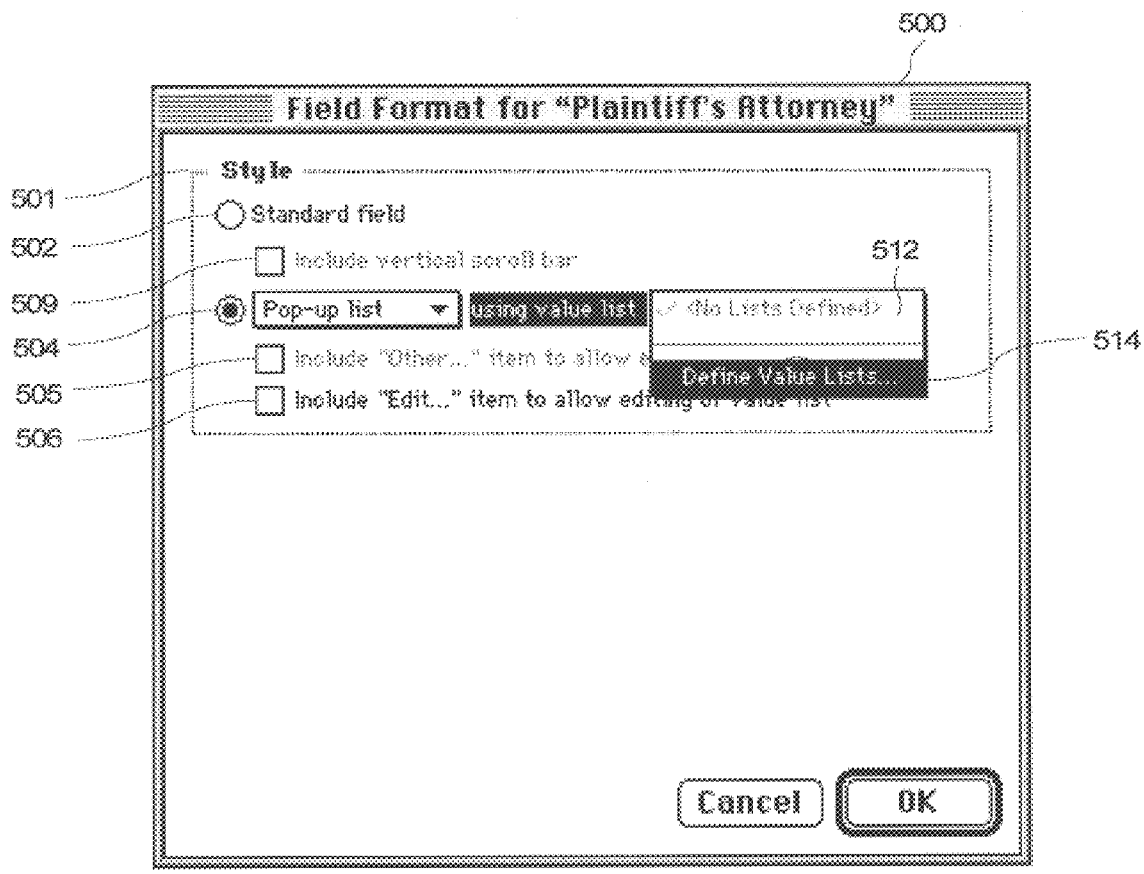
FIG. 5A shows a user interface for defining format characteristics of a selected field in accordance with a preferred embodiment of the invention.

FIG. 5A shows a user interface 500 used for defining the characteristics of a selected field. By way of example, if a user (e.g., court clerk) wants to set plaintiff's attorney field 308 to have a value list that is based on fields in attorneys database 404 of FIG. 4, the user will first make sure that the court docket database 302 is set to layout mode 320. Once court docket database 302 is set to layout mode 320, the user may select plaintiff's attorney field 308 by placing the pointer over plaintiff's attorney field 308 and clicking on the mouse or other suitable selection device. Next, the user may go to the main menu bar (not shown) and select "format" from the main menu bar and then "field format." Alternatively, the user may employ short-cut key strokes. Exemplary shortcut key strokes for the Macintosh may be "OPTION+COMMAND+F" which brings up user interface 500 directly.

Once user interface 500 appears, the user interface will be labeled to identify the field for which a value list is being created. In this example, user interface is identified as "field format for plaintiff's attorney". As shown, user interface 500 has a style section 501 that contains a number of selection options available to the user for formatting the selected field. By way of example, the user may either select a standard field 502 which allows the user to manually enter values into plaintiff's attorney field 308 by typing in a new attorney's name each time a new case is entered into the court docket.

Although standard field 502 provides a user with some flexibility, the user may enter information that is improper or incorrect. By way of example, the clerk may enter in an attorney who is not yet licensed to practice before the court. Obviously, if the clerk was selecting from a value list of attorneys that were already confirmed to be licensed, e.g., based on database 404, data entry by the clerk would be more accurate and less prone to errors.

Further, as shown in user interface 500, an "other . . ." option 505 and an "edit . . ." option 506 is presented to the user. When the user selects the "other . . ." option 505, the program allows a user to enter a value which is not a member of the value list while the user is performing data entry in browse mode 316. When the user selects the "edit . . ." option 506, the value list provides the user with the option of editing the created value list while in browse mode. The "edit . . ." option 506 will be described in greater detail below with reference to FIGS. 7A–7E.

If the user wants to create a value list for plaintiff's attorney field 308, radio button 504 is selected to enable the definition of a new value list. In this embodiment, the user may define the format in which the value list will be displayed to the user during data entry. Generally, there are many suitable types of control formats that may be used. Suitable controls may include a pop-up list, a pop-up menu, checkboxes, radio buttons, etc. It should be understood that the manner in which the value lists are displayed may be modified at anytime, such as for example, before, during or after the creation of the value list.

Assume for example that a value list had previously been created for a particular field, then that value list would also be available for use by any other field that is able to make use of that type of information. However, in this example, no value lists are shown to have been created in the past as evident from a window 512 which is designed to display previously created value lists. As illustrated in user interface 500, the user has already selected the plaintiff's attorney field 308 for the new value list. In this embodiment, the user then selects window 512 and selects "Define Value List . . ." 514. By performing this operation, the user has initiated the creation of a new value list.

Figure 5B:
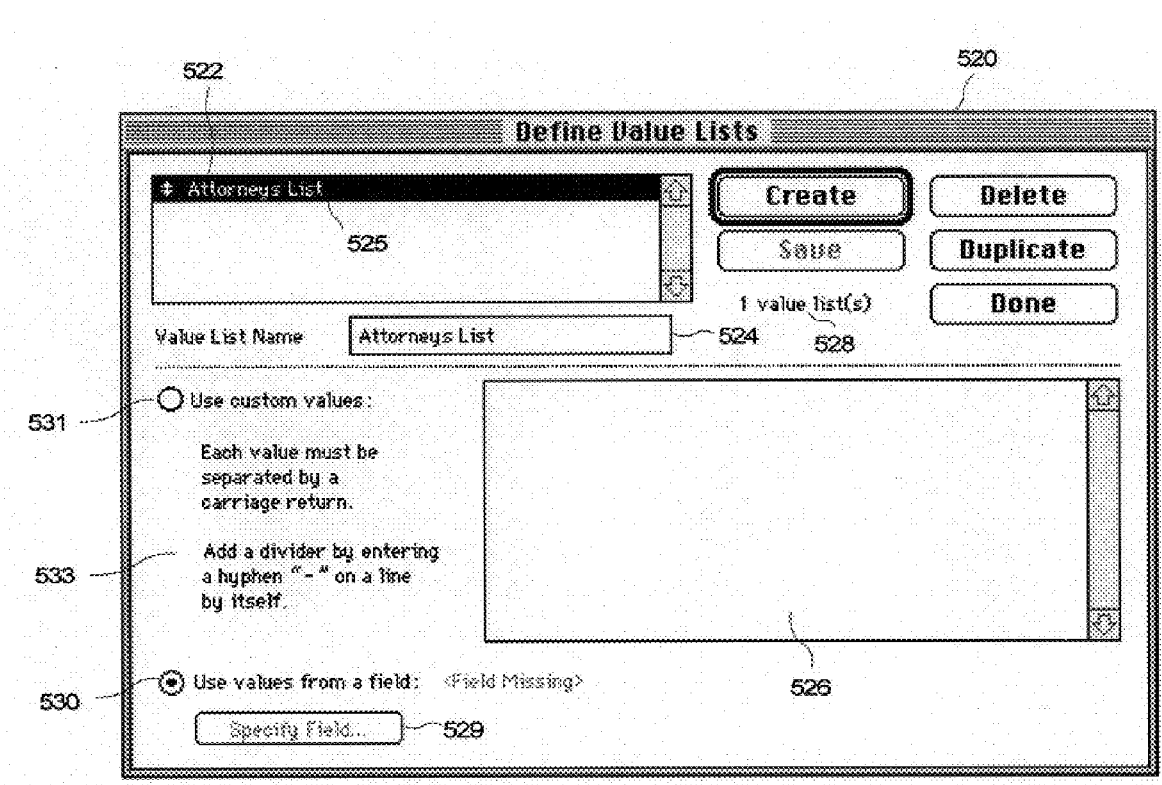
FIG. 5B shows a user interface used for creating custom and field based value lists in accordance with a preferred embodiment of the invention.

FIG. 5B shows a user interface 520 that is presented to the user after "Define Value List . . ." 514 is selected. At this point, the user may give the value list a name that is descriptive of the contents of the selected values. In this example, the user wants to create a value list for plaintiff's attorney field 308 that has specific values (e.g., attorneys names) contained in attorneys database 404 of FIG. 4. The user will then input a descriptive name for the value list in "Value List Name" field 524. Once the user has entered a descriptive name for the value list in Value List Name field 524, the user can select the "Create" selection icon. Upon selecting Create, a copy of the name provided in Value List Name field 524 is placed in a scroll window 522.

In this embodiment, the name selected for the value list is "Attorneys List" 525, and that name will now be present in both Value List Name field 524 and scroll window 522. The user interface 520 will now inform the user at 528 that there is one (1) value list currently being defined having the name of "Attorneys List" 525.

Once the value list has been descriptively named, the user may determine whether to use "Custom Values" 531 or "Values From A Field" 530 to define the value list. By way of example, if the user desires to use Custom Values 531, the user may enter values in scroll window 526 in a vertical list format such that a carriage return separates each entered value. Further, if the user wants to set apart certain values in a custom value list by introducing dividing section lines, the user may include separators by entering a hyphen "-" in place of a value which is separated by a carriage return. Once the value list is created using custom values, the user can save the newly created custom value list. In this manner, the value list may be used by the specified field or re-used by other fields in the same database or by fields in another database once the values have been defined.

In another embodiment, the user may want to use values from other fields that are either within the current database or other databases. Thus, when radio button 530 is selected, the user may specify the field in which the values reside by selecting "Specify Fields" 529. Because in this example the user wants to create a value list having attorneys names, the user will preferably specify the fields from attorneys database 404 of FIG. 4.

Figure 5C:
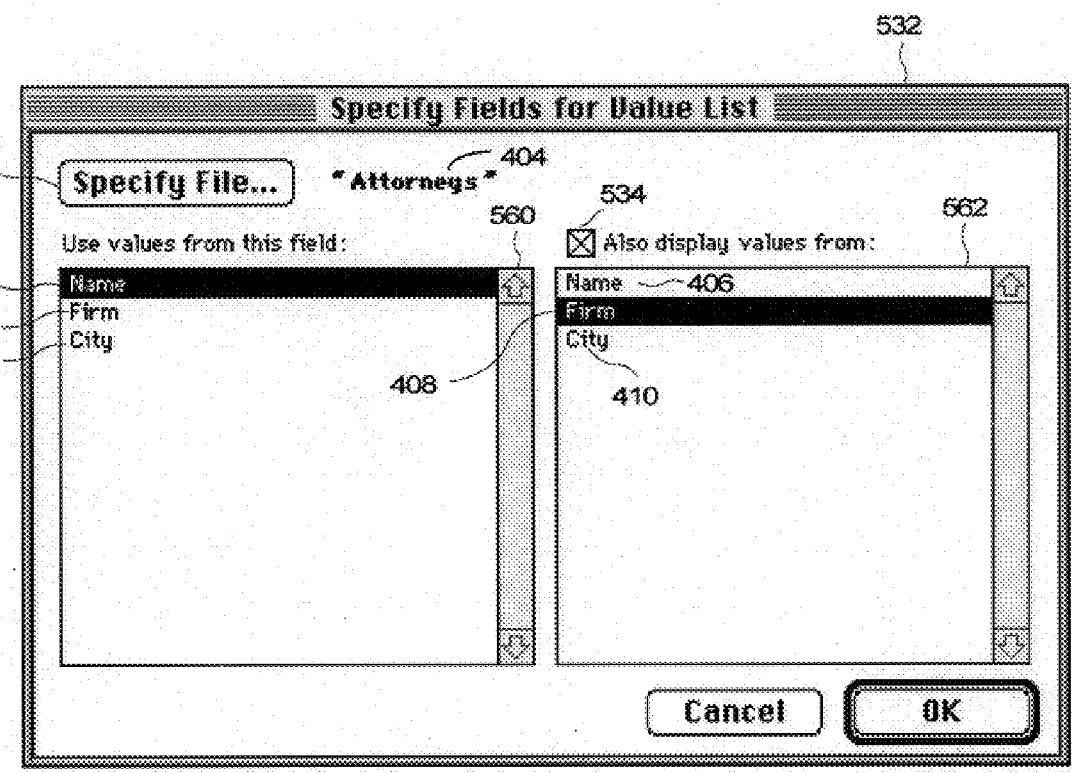
FIG. 5C shows a user interface for selecting an appropriate database file and associated fields for a named value list in accordance with a preferred embodiment of the invention.

Once Specify Fields 529 is selected, a user interface 532 is presented in FIG. 5C such that the user may select an appropriate database file containing the desired fields for creating Attorneys List 525. As shown, attorneys database 404 of FIG. 4 has been selected by the user for creating Attorneys List 525. Once the appropriate file has been selected, the user is presented with an itemization of fields contained within attorneys database 404. Accordingly, the user can then select the particular field it wants in the value list it is creating.

As illustrated, user interface 532 contains a display for a first section 560 used to define the fields used in data entry, and section 562 may optionally display additional fields in the value list that is displayed during data entry. In this embodiment, the values associated with the fields in section 562 will not appear as entered data when a particular value is selected from the value list during data entry. In this example, the information provided in section 562 is optional, and is preferably provided when checkbox 534 is selected. Generally, the information in section 562 provides the user with additional information to assist the user in identifying an appropriate selection when performing data entry.

By way of example, the user may not remember the name of a particular attorney involved in a particular matter, but if the attorney's firm is displayed alongside the name of the attorney, the user entering the information may be more likely to remember the correct attorney name when performing the entry. As described earlier, this feature may find particular significance in situations where a user is performing data entry of "part numbers" in an invoice database. As can be appreciated, most users will be unable to remember a correct part number without having to take time out to look it up. Obviously, this could potentially slow down data entry and lower productivity. However, if the user is presented with the part number and the part name in the value list displayed during data entry, the user will be more efficient and better able to correctly choose the part number without taking time out to look it up.

Figure 5D:
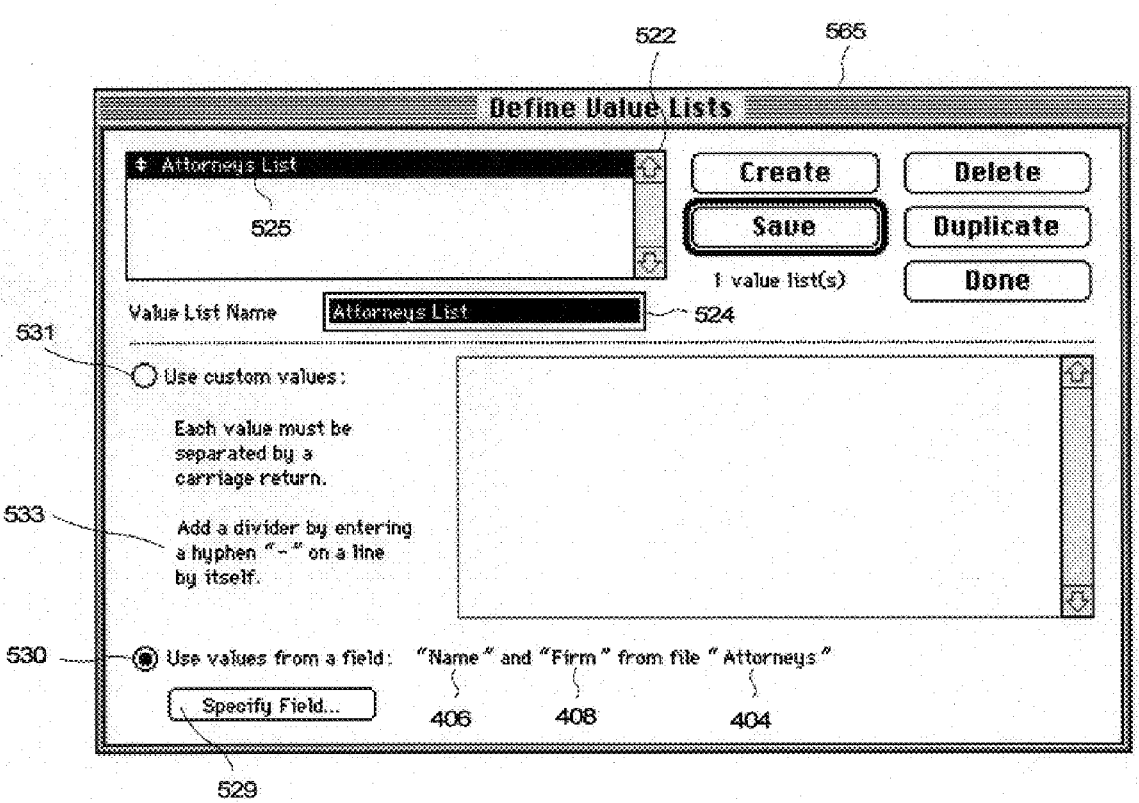
FIG. 5D shows a user interface identifying the name of a recently created value list having values from fields of an identified database file in accordance with a preferred embodiment of the invention.

Once the correct fields have been selected for the value list in user interface 532, the user is presented with user interface 565 of FIG. 5D. User interface 565 shows that Attorneys List 525 has been defined as a value list, and that it is based on Specific Fields 529. As illustrated, radio button 530 is selected, and the values displayed in the value list are coming from name field 406, and firm fields 408. Accordingly, these fields will be displayed for the user as a value list during data entry. Further, user interface 565 shows that the value list's values are coming from attorneys database 404 of FIG. 4. Of course, the value list values could have come from fields in the same database or another database created for another project.

Figure 5E:
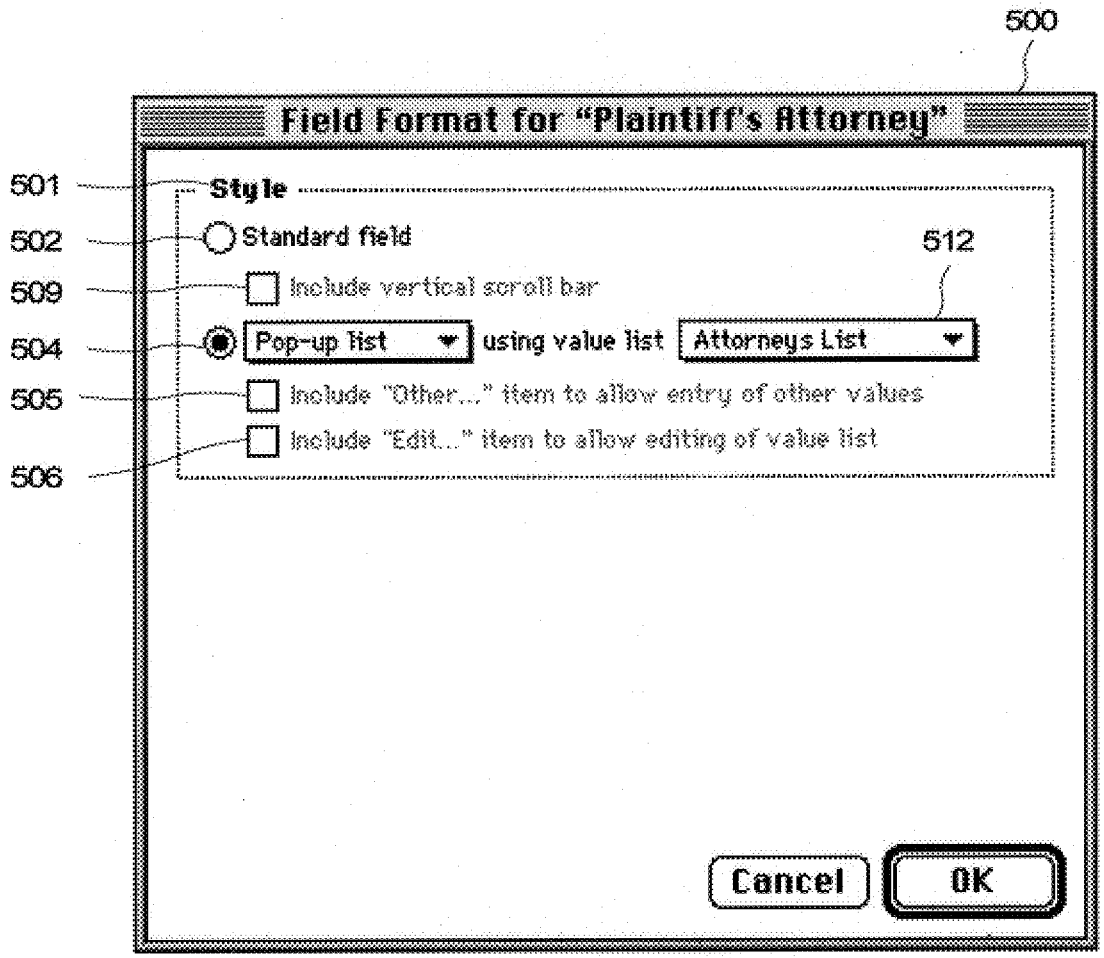
FIG. 5E shows a user interface identifying a selected field and a value list being associated with the selected field in accordance with a preferred embodiment of the invention.

Reference is now drawn to FIG. 5E which shows that a value list, "Attorneys List," has been created for plaintiff's attorney field 308 as shown in window 512. As shown in the title of user interface 500, the field format is defined for plaintiff's attorney field 308 of FIG. 3. However, as described above, once a value list has been created, other fields may use that same value list for performing data entry.

Figure 5F:
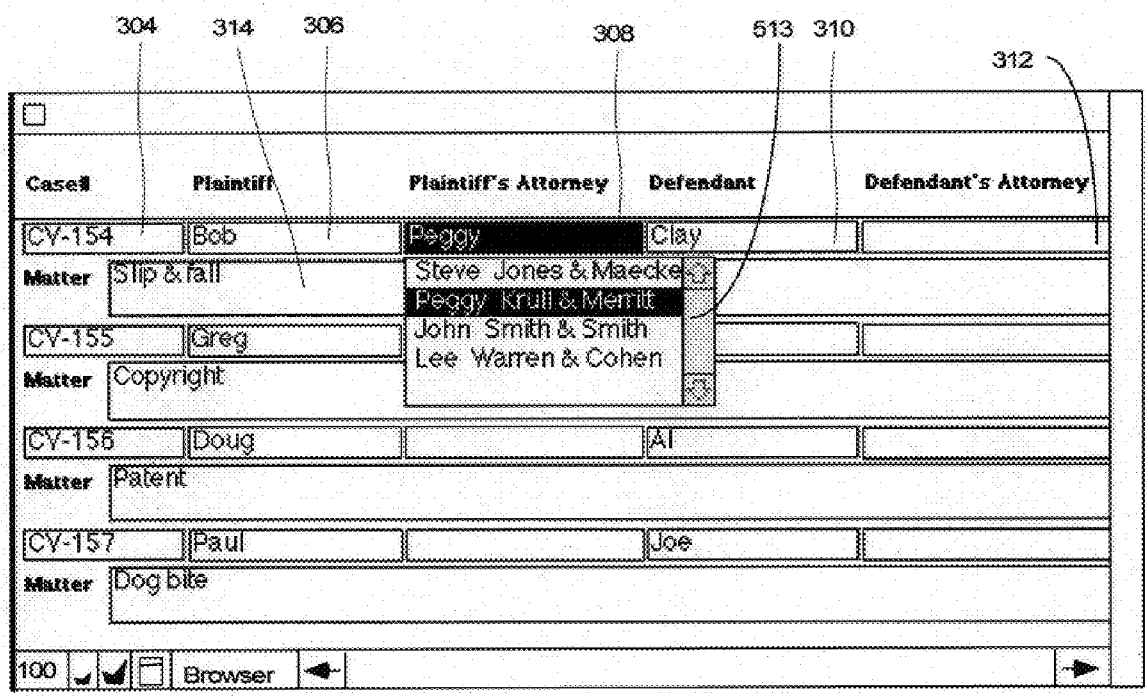
FIG. 5F shows a database having a field selected in data entry mode, and a value list associated with the selected field in accordance with a preferred embodiment of the invention.

At this point, a value list 513 has been created for plaintiff's attorney field 308 of FIG. 3, and the user may now select browse mode in order to perform data entry in court docket database 302. Once in browse mode 316, the user may select plaintiff's attorney field 308, and the created value list 513 named "Attorneys List" will pop-up in the form of a list representing choices of attorneys that may be entered into the field. As shown in FIG. 5F, attorney "Peggy" is selected and the user is assisted in the selection since Peggy's firm of Krull & Merritt is displayed alongside her name.

In certain situations, the user may be familiar with the firm that attorney Peggy is associated with. In this manner, the user is advantageously aided by being able to associate Peggy with her firm of Krull & Merritt. As described above, Attorneys List will have extra identifying information since the user selected checkbox 534 in FIG. 5C when value list was created in layout mode 320.

As described above, once Attorneys List is created for a particular field, that value list 513 can be used by other fields in either the same database or other databases that can make use the values in value list 513 which is named Attorneys List. In this embodiment, the identical Attorneys List may be used for entering attorneys in defendant's attorney field 312.

Figure 6A:
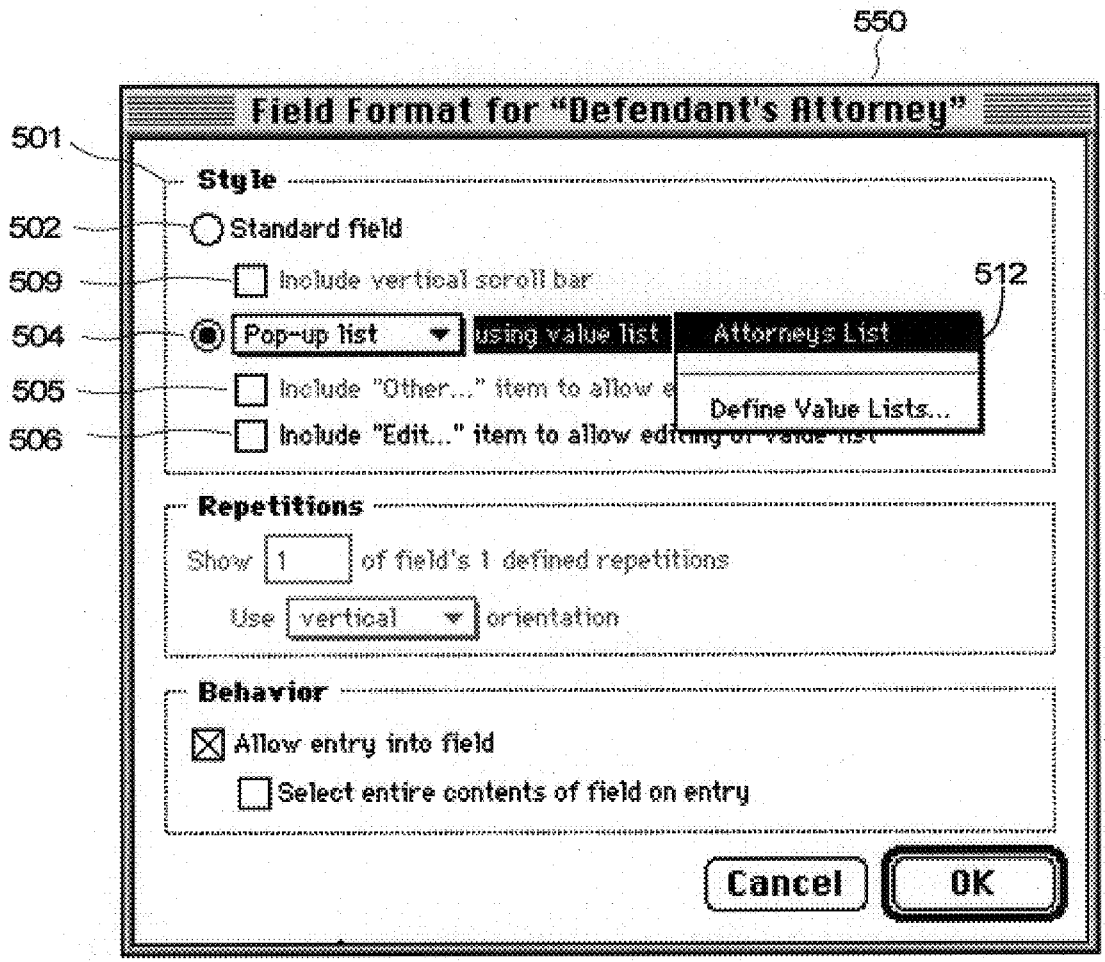
FIG. 6A shows a user interface selecting a second field and a previously created value list that is shared by the second field in accordance with a preferred embodiment of the invention.

In one embodiment, FIG. 6A shows a user interface 500 labeled "field format for defendant's attorney". This means that the user previously shifted to layout mode 320, selected defendant's attorney field 312, and then selected "field format . . ." from the main menu bar. Alternatively, the user may employ short-cut key strokes such as a "OPTION+ COMMAND+F" to bring up user interface 500 once defendant's attorney field 312 has been selected. At this point, radio button 504 is selected and the user may select an existing value list from window 512. In this example, the user will select previously created Attorneys List as the value list for defendant's attorney field 312. In this manner the user can make use of the value list which is based on attorneys database 404 of FIG. 4. Advantageously, if any updates are made to attorneys database 404, those updates will almost instantly appear in value list 513 named Attorneys List.

Figure 6B:
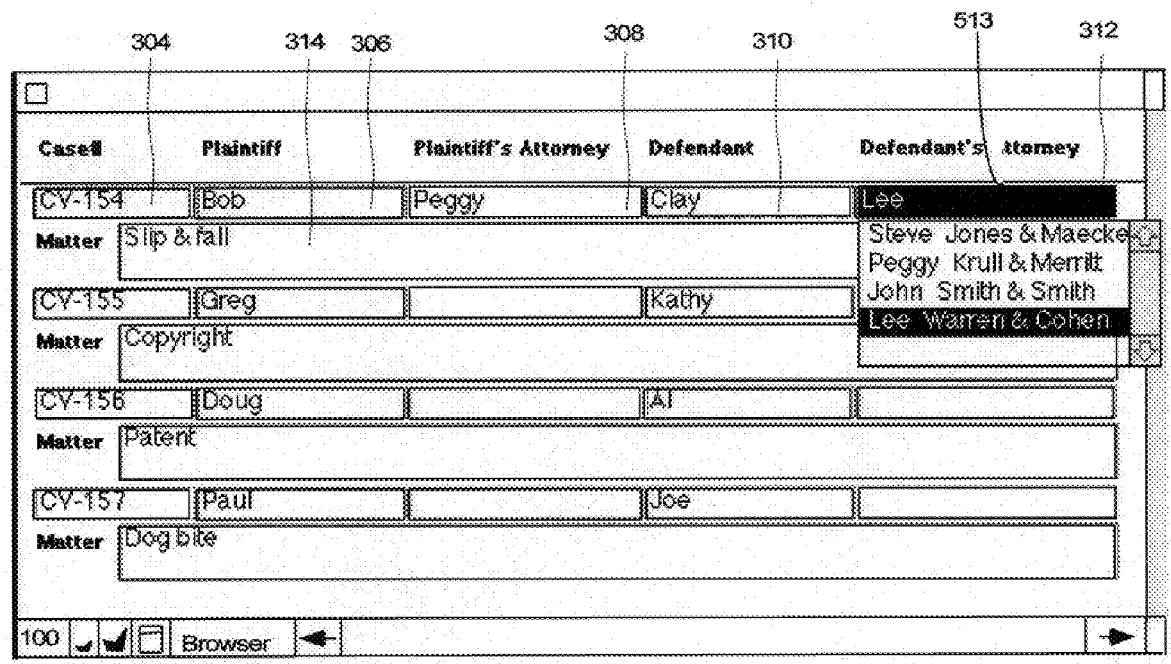
FIG. 6B shows a database having the second field selected in data entry mode, and a previously created value list being used by the second field in accordance with a preferred embodiment of the invention.

Once Attorneys List is selected as the value list for defendant's attorney field 312, the user may revert back to browse mode 316 so the user can proceed with data entry. Therefore, as shown in FIG. 6B, court docket database 302 shows defendant's attorney field 312 selected, and a pop-up value list 513 provided for the user to choose an attorney for defendant's attorney field 312. As illustrated, the user selected "Lee" as the defendant's attorney for this particular case. As described above, in order to assist the user during data entry, both the attorney name and the attorney's firm "Warren & Cohen" are provided to enable the user (e.g., court clerk) to appropriately select the correct attorney for this "slip & fall" matter.

Of course, once defendant's attorney field 312 has been assigned a particular value list, that value list which is based on fields of another database, will automatically be updated when the fields in attorneys database 404 of FIG. 4 is updated, which advantageously does not require updating value list 513 in every field it is used.

Figure 7A:
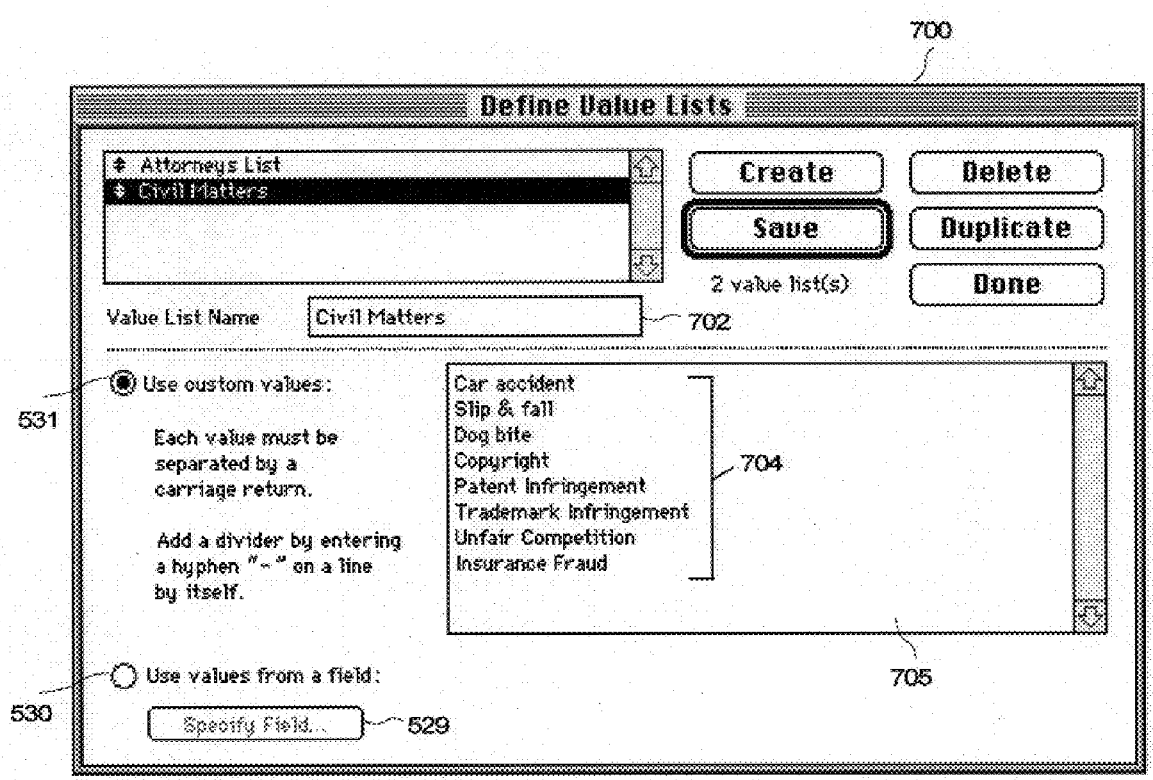
Figure 7B:
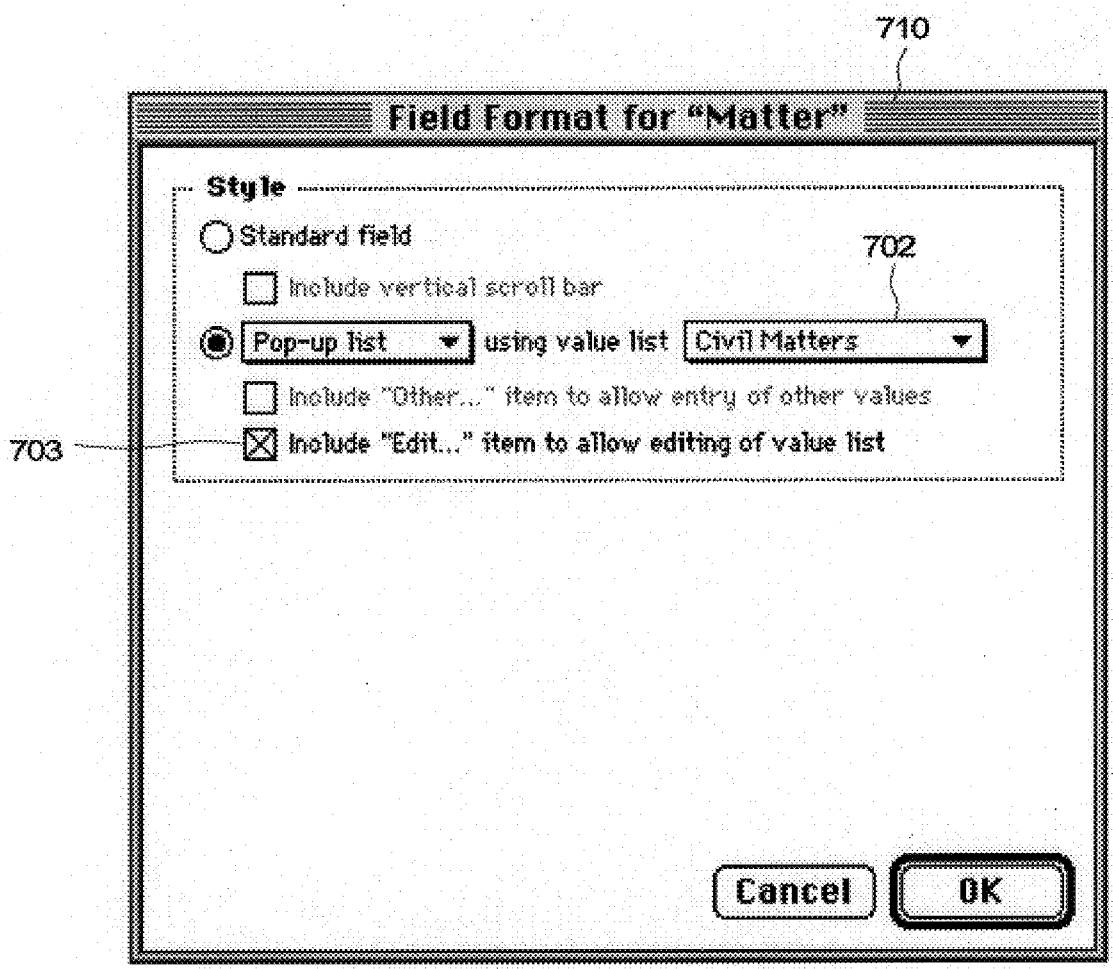

FIGS. 7A through 7E will now be described with reference to the operations associated with performing edits to existing value lists while performing data entry in browse mode 316. FIG. 7A shows a "Define Value Lists" user interface 700 having a value list named Civil Matters 702 being created by the user. In this embodiment, the user is creating the value list by defining custom values 704. As shown, there are now two value lists available to the user for facilitating field data entry. To create a custom value list, the user may select radio button 531, and manually enter the values for the value list named Civil Matters 702. In this example, the custom values are separated by a carriage return as shown in scroll window 705. Once the custom value list has been created, the user may save that custom value list 704.

Next, user interface 710 is presented to the user which identifies Civil Matters 702 as the current value list being associated with matter field 314 of FIG. 3. As described above, the user is preferably provided with an option to mark checkbox 703 which presents the user with an "edit" option when the user is performing data entry in browse mode 316. Advantageously, this allows the user, or a network administrator to edit an existing value list without having to bring down the network. For example, if there are a number of users performing data entry over a shared database (e.g., a shared move rental database), it would be counterproductive to bring down the database network to update a value list. As will be described below, making a change to an existing value list can be performed by simply selecting the "edit" option displayed in the value list being used.

Reference is now drawn to FIG. 7C where the user now reverts to browse mode and selects matter field 314. Upon selecting matter field 314, a pop-up value list 730 is presented having the aforementioned values 704 which are used during data entry. For example, if the user wants to change the matter in matter field 314, the user can simply select matter field 314 and then select the correct matter from values 704.

Figure 7D:
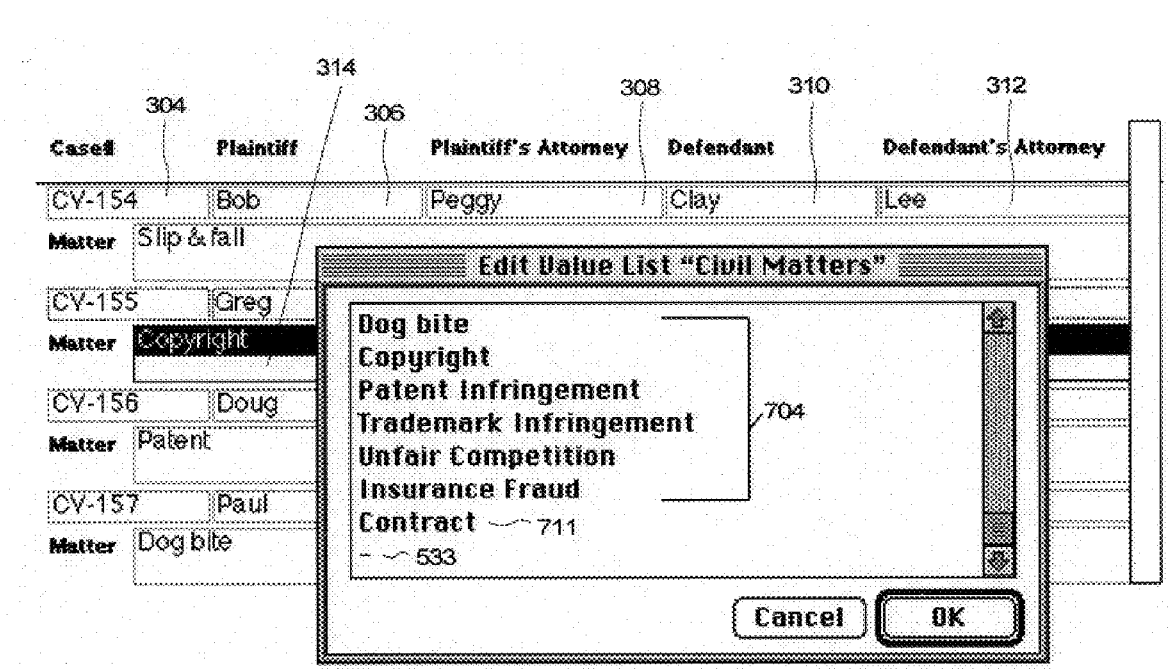

However, if the user does not find the correct value among the values in value list 730, the user may select edit option 705 which presents the user with a user interface entitled "Edit Value List 'Civil Matters'" as shown in FIG. 7D. As illustrated, the user interface allows a user to perform editing on the values of value list 730. By way of example, the user may edit the existing value list 730 by including an additional value entitled "contract" 711. Thus, the user can simply perform a carriage return and type in "contract" for the new value after "Insurance Fraud" of existing value list 730. Advantageously, once the additional value is entered, it will be available for future use by other fields or by the same field.

For illustration purposes, FIG. 7E shows matter field 314 being selected, and a modified value list 730 that includes a new value entitled "contract" 711 that is displayed as a selection choice along with the original values 704. It should be noted that since the edit option 705 is again displayed, the user can continue to perform edits to an existing value list as they become necessary. Of course, editing is not limited to entering additional values into a particular value list, but may also include editing existing values, subtracting existing values, rearranging existing values, placing hyphen separators, etc.

Figure 8:
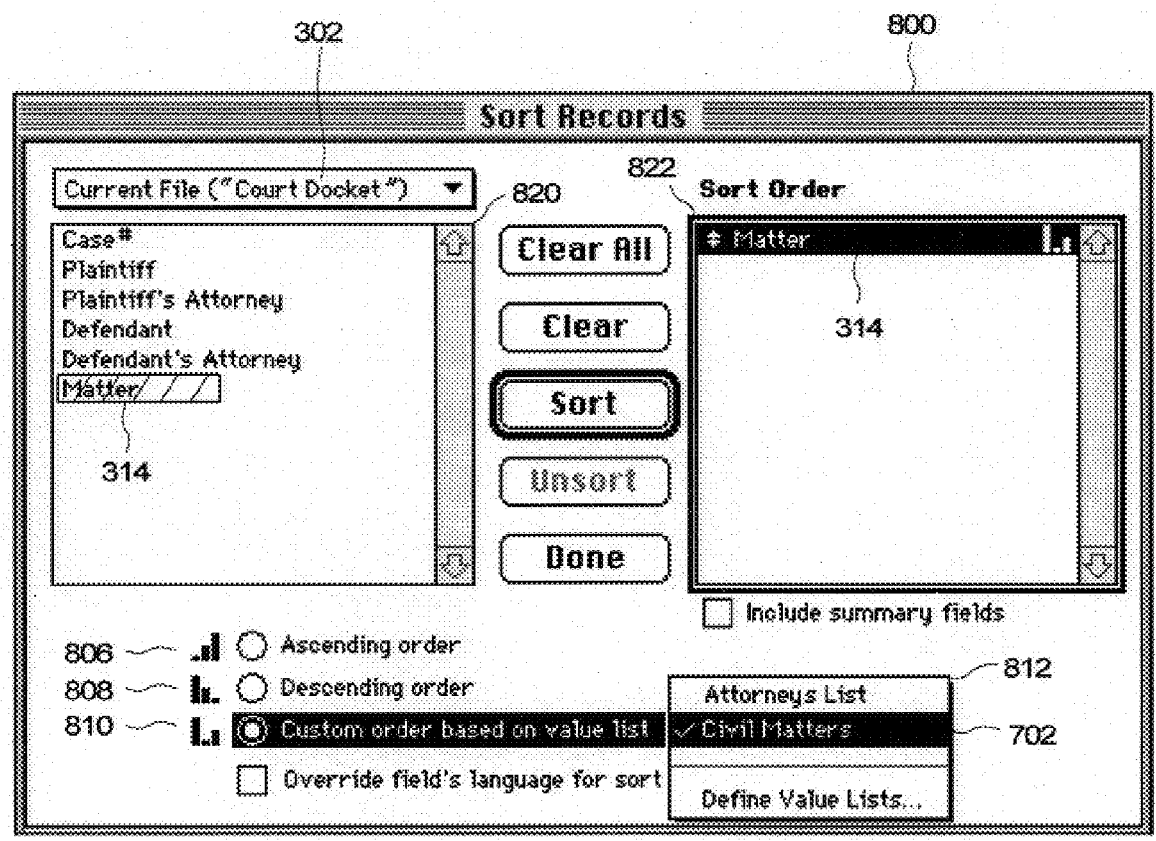
FIG. 8 shows a user interface used for sorting records in a selected database in accordance with one embodiment of the present invention.

FIG. 8 shows a user interface 800 that is used for sorting records in a selected database in accordance with one embodiment of the present invention. In this embodiment, when the user is working on a current database, such as court docket database 302 of FIG. 3, the user may want to sort certain fields in the database in accordance with certain criteria. The user may therefore initiate a sorting operation by selecting "mode" in the main menu bar, and then select "sort . . . " which brings up user interface 800. Although there are many suitable methods for initiating a sorting operation, the user may also use short-cut keystrokes. By way of example, "COMMAND+S" may be used in the Macintosh to bring up user interface 800. As shown, user interface 800 has a section 820 that contains a listing of all of the fields contained in court docket database 302.

By way of example, if the user wants to sort matter field 314, the user may select "Matter" in section 820 which enables the moving of matter field 314 to a section 822. In this manner, matter field 314 has been identified for sorting in accordance with one embodiment. Once matter field 314 has been identified for sorting, the user may select a radio button 806 for sorting in ascending alphabetical order, a radio button 808 for sorting in descending alphabetical order, or a radio button 810 for sorting in accordance with a custom order based on a value list. If the user selects radio button 810, matter field 3 14 will preferably be sorted in accordance with the organization of the value list selected in a window 812.

In this example, civil matters 702 has been selected by the user such that sorting will be performed in accordance with the order of civil matters 702. However, if the user prefers to define a new value list for which sorting will be based, the user may select "Define Value List" which enables the definition of a new value list. It should be understood that during a sorting operation, the user will preferably be in browse mode 316, and therefore creating a value list "on-the-fly" while performing a sorting operation advantageously avoids having to revert to a layout mode 320. As described above, the advantages are numerous in that the user need not bring down the system in order to define a value list when sorting in accordance with a custom value list.

Figure 9:
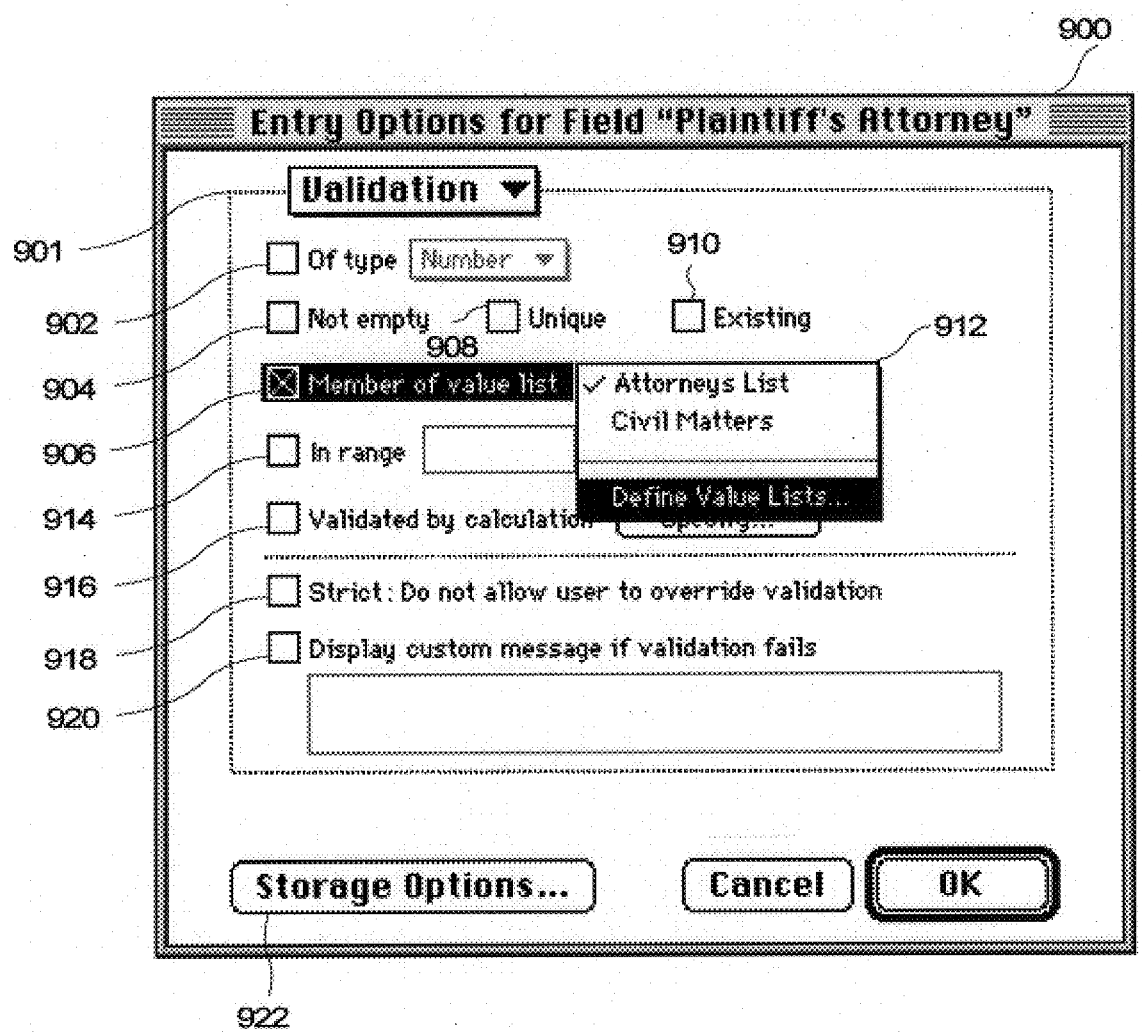
FIG. 9 shows a user interface used for validating data entered into fields of a database in accordance with one embodiment of the present invention.

Reference is now drawn to FIG. 9 which shows a user interface 900 used in validating data that may be entered into fields of a database. In one example, the user may want to assign a validation to a particular field in court docket database 302 of FIG. 3. By way of example, the user may want to restrict the types of information which can be entered into plaintiff's attorney field 308. In this embodiment, the user is provided with a validation interface 901 containing a number of validation options. As illustrated, the user may select "Of type" 902, "Not empty" 904, "Unique" 908, "Existing" 910, "Member of a value list" 906, "In range" 914, "Validated by calculation" 916, "Strict: Do not allow user to override validation" 918, and "Display custom message if validation fails" 920.

Broadly speaking, "Of type" validation 902 is a requirement that the value entered must be a number, date, or time. "Not empty" validation 904 generally requires that a field contain a value that is not left blank. "Unique" validation 908 requires that the field entry does not duplicate a unique value found in a field of other records (capitalization and punctuation are ignored). "Existing" validation 910 requires that the field entry match another value in the same field in any other record (capitalization and punctuation are ignored). "In range" validation 914 requires that the field entry is within a specific range of numbers, dates, words, or times. "Validation by calculation" 916 requires that the field entry is true based on a boolean calculation.

Further, "Strict: Do not allow user to override validation" 918 prevents users form entering invalid data by not allowing the user to override a validation requirement. "Display custom message if validation fails" 920 provides a message dialog indicating to the user that the data does not meet a validation requirement. Typically, these dialogs may provide the user with suggestions on entering correct validated data.

Of particular interest is "Members of value list" validation 906 which allows a user to validate a field such that the field entry be a value contained in a given value list. When checkbox 906 is selected, the user may then select a value list from an existing value list displayed in window 912. In one example, the user may select a value list such as "Attorneys List" or "Civil Matters" from window 912. As shown, the set validation requires that data entered into plaintiffs attorney field 308 be selected from value list Attorneys List.

Alternatively, the user may define a new value list which is not part of the value list choices presented in window 912. In such a case, the user is advantageously allowed to define a new value list "on-the-fly" without having to leave browse mode 316 as described above. Once the validation operation has been performed, the user may select storage option 922 for storing the required validation requirements.

Figure 10:
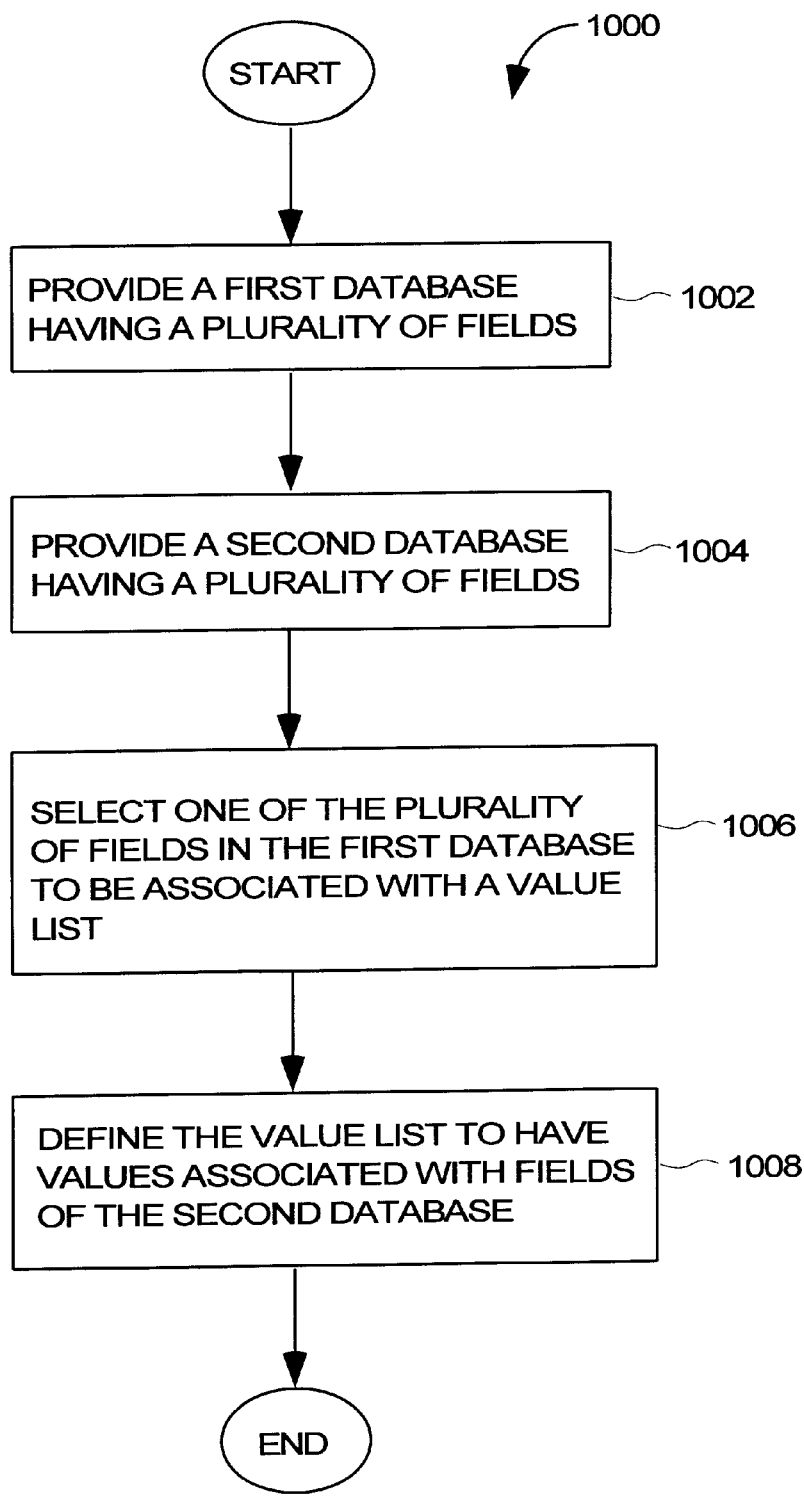
FIG. 10 is a flow chart diagram illustrating the operations associated with creating a value list in accordance with one embodiment of this invention.

Reference is now drawn to FIG. 10 which is a flow chart diagram used to illustrate the operations associated with defining a value list in accordance with one embodiment of this invention. In this embodiment, the flow chart diagram 1000 begins at an operation 1002 where a first database having a plurality of fields is provided. As described above, the first database may have any number of fields which may be organized about the database in order to facilitate data entry and provide clear presentation once the database is printed or displayed.

From operation 1002, the process proceeds to an operation 1004 where a second database having a plurality of fields is provided. As described above, this second database will also include custom fields organized about the database in order to facilitate data entry and provide clear presentation of the entered values.

The process then proceeds to an operation 1006 where a user may select one of the plurality of fields in the first database to be associated with a value list. By way of example, the selected field may be a field in which a user desires to input frequently changing data. Therefore, the frequently changing data may be state codes in a client address field block. In this example, a client's business state may be changed by implementing a value list having a list of all 50 states. In this manner, the user can simply select the correct state by using a value list.

At this point, the process proceeds to an operation 1008 where the user defines a value list to have values associated with fields of a second database. By way of example, the user may select a second database having a listing of states in each field. In this manner, the "state" value list can be defined based on the values of the second database. In this manner, if fields in the second database are subsequently updated, e.g., by adding Puerto Rico as a state, the value list used in the first database will be advantageously automatically updated. Furthermore, once the "state" value list has been created, that value list may be shared by other fields in the same database. At this point, an appropriate value list has been created in accordance with one embodiment of this invention and the process ends.

Figure 11:
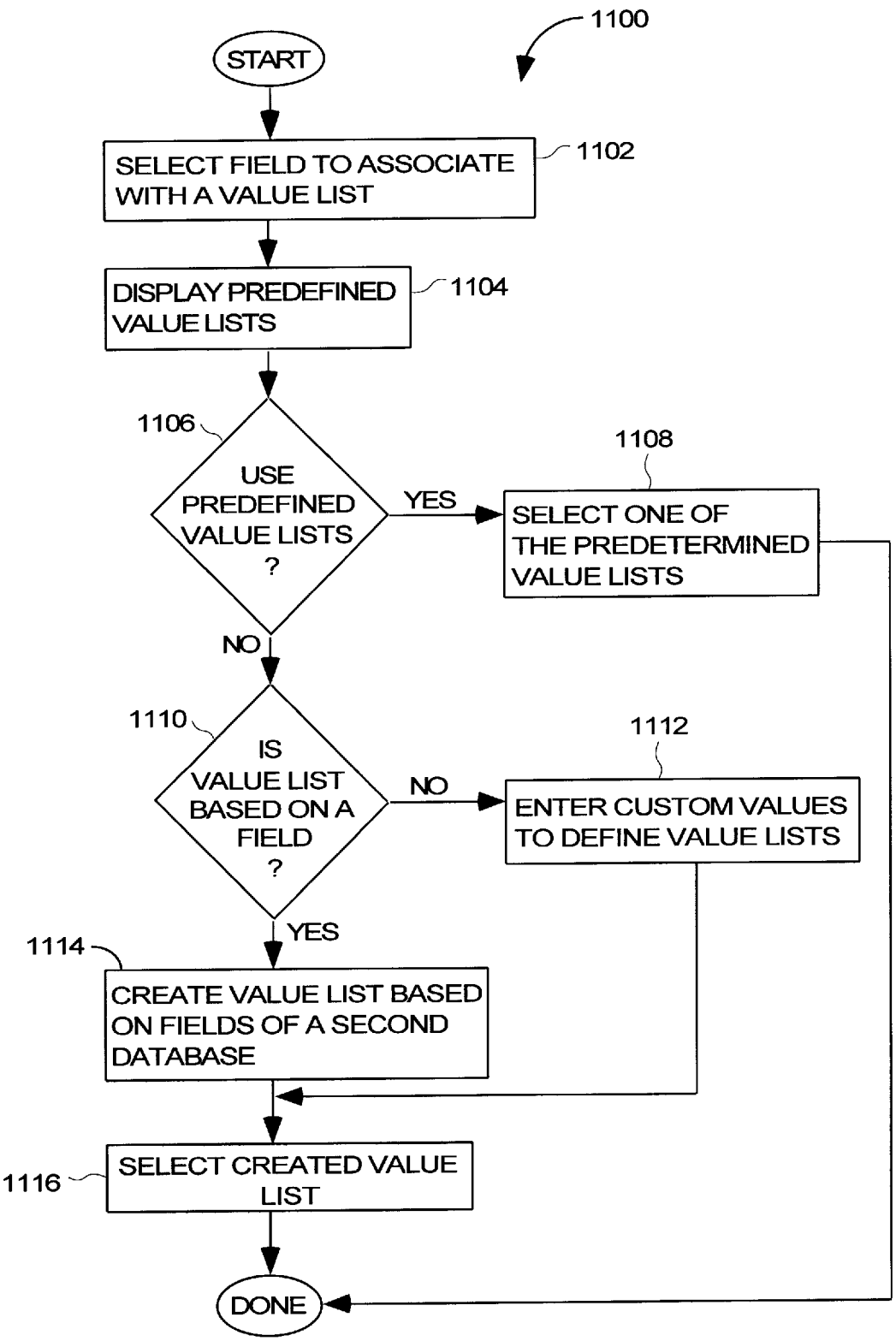
FIG. 11 is a flow chart diagram illustrating the operations associated with creating a value list in accordance with another embodiment of the present invention.

FIG. 11 is a flow chart diagram 1100 illustrating the operations performed in defining a value list in accordance with another embodiment of the present invention. At an operation 1102, a user will select a field in a first database in order to associate the selected field with a value list. Once a field is selected, the process proceeds to an operation 1104 where the user is provided with a user interface displaying one or more predefined value lists that may be associated with the selected field. At this point, the process proceeds to a decision block 1106 where the user determines whether to use one of the predefined value lists.

If the user decides to use a predefined value list, the process proceeds to an operation 1108 where the user performs the selection of one of the predefined value lists for the selected field. On the other hand, if the user does not desire to use a predefined value list, the process proceed to another decision at operation 1110 where it is determined whether the user wants to create a value list based on a field. If the user does not want to create a value list based on a field, the process proceeds to an operation 1112 where custom values are entered to create a new value list as described above.

On the other hand, if the user does want to use a value list based on a field, the process proceeds to an operation 1114 where the user creates a value list based on fields of a second database. As can be appreciated, this has the potential of advantageously reducing the amount of work associated with entering custom values each time frequently used values are needed. By way of example, if the user needs a "state" value list having all 50 states as selection choices, the user may simply refer to a database having all 50 states already entered in its fields. Further, once the value list is created, it can be shared by other fields in the same database.

At this point, once a value list is created based on fields of a second database in operation 1114, or based on custom values defined in operation 1112, the process will proceed to an operation 1116 where the user may select the created value list. Once the value list has been selected for use with the selected field in the first database, the process associated with this embodiment of the present invention will be done. However, if the user decided in operation 1106 that it wanted to use a previously defined value list, then the value list selected in operation 1108 will be used with the selected field and the process will be done.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 12:
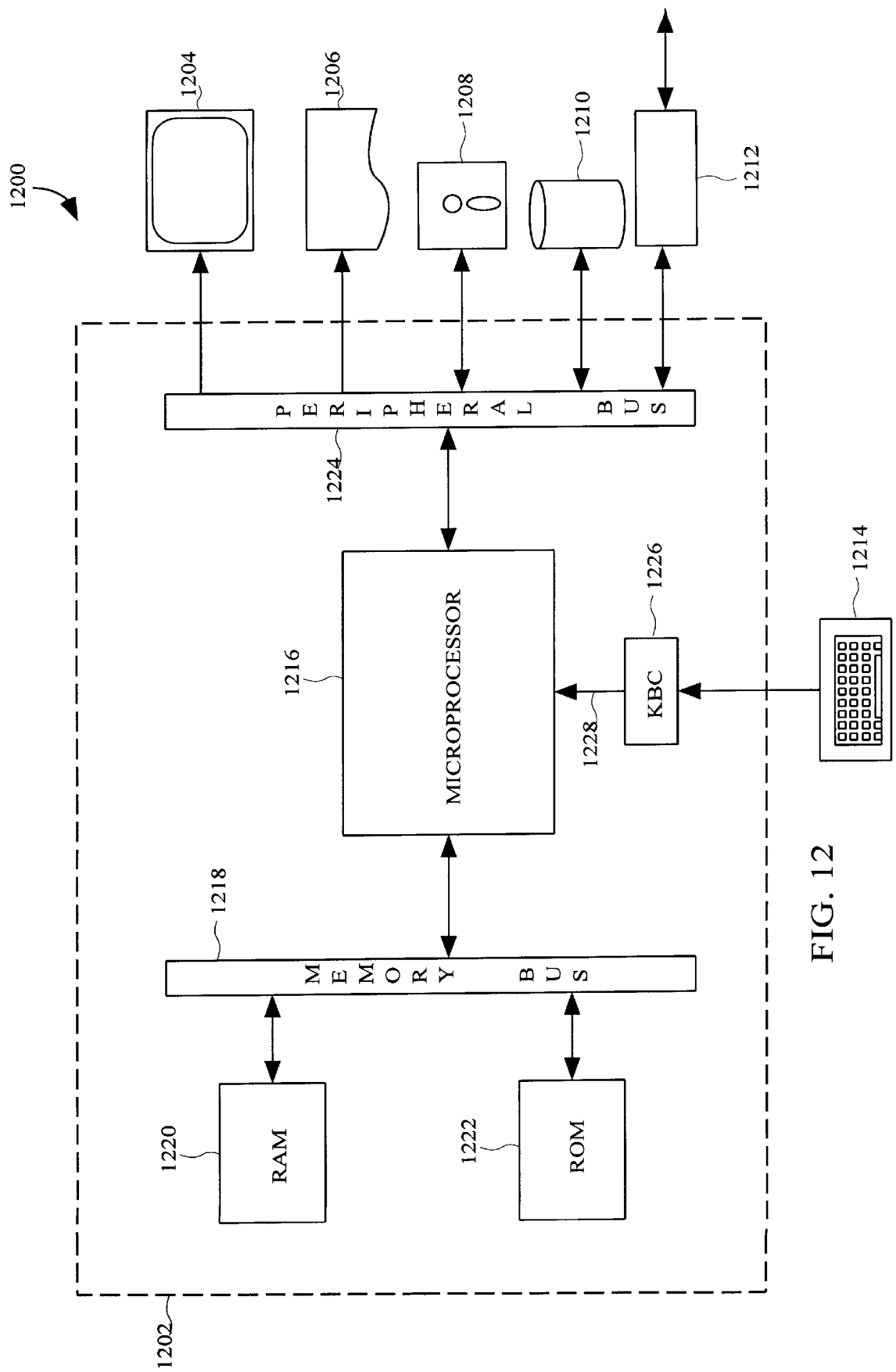
FIG. 12 is a block diagram of an exemplary computer system for carrying out the processing according to the invention.

FIG. 12 is a block diagram of an exemplary computer system 1200 for carrying out the processing according to the invention. The computer system 1200 includes a digital computer 1202, a display screen (or monitor) 1204, a printer 1206, a floppy disk drive 1208, a hard disk drive 1210, a network interface 1212, and a keyboard 1214. The digital computer 1202 includes a microprocessor 1216, a memory bus 1218, random access memory (RAM) 1220, read only memory (ROM) 1222, a peripheral bus 1224, and a keyboard controller 1226. The digital computer 1200 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1216 is a general purpose digital processor which controls the operation of the computer system 1200. The microprocessor 1216 can be a single-chip processor or can be implemented with multiple components. Using instructions retrieved from memory, the microprocessor 1216 controls the reception and manipulation of input data and the output and display of data on output devices. According to the invention, a particular function of microprocessor 1216 is to assist in the processing of value list generation.

The memory bus 1218 is used by the microprocessor 1216 to access the RAM 1220 and the ROM 1222. The RAM 1220 is used by the microprocessor 1216 as a general storage area and as scratch-pad memory, and can also be used to store input data and processed data. The ROM 1222 can be used to store instructions or program code followed by the microprocessor 1216 as well as other data.

The peripheral bus 1224 is used to access the input, output, and storage devices used by the digital computer 1202. In the described embodiment, these devices include the display screen 1204, the printer device 1206, the floppy disk drive 1208, the hard disk drive 1210, and the network interface 1212. The keyboard controller 1226 is used to receive input from keyboard 1214 and send decoded symbols for each pressed key to microprocessor 1216 over bus 1228.

The display screen 1204 is an output device that displays images of data provided by the microprocessor 1216 via the peripheral bus 1224 or provided by other components in the computer system 1200. The printer device 1206 when operating as a printer provides an image on a sheet of paper or a similar surface. Other output devices such as a plotter, typesetter, etc. can be used in place of, or in addition to, the printer device 1206.

The floppy disk drive 1208 and the hard disk drive 1210 can be used to store various types of data. The floppy disk drive 1208 facilitates transporting such data to other computer systems, and hard disk drive 1210 permits fast access to large amounts of stored data.

The microprocessor 1216 together with an operating system operate to execute computer code and produce and use data. The computer code and data may reside on the RAM 1220, the ROM 1222, or the hard disk drive 1220. The computer code and data could also reside on a removable program medium and loaded or installed onto the computer system 1200 when needed. Removable program mediums include, for example, CD-ROM, PC-CARD, floppy disk and magnetic tape.

The network interface 1212 is used to send and receive data over a network connected to other computer systems. An interface card or similar device and appropriate software implemented by the microprocessor 1216 can be used to connect the computer system 1200 to an existing network and transfer data according to standard protocols.

The keyboard 1214 is used by a user to input commands and other instructions to the computer system 1200. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Broadly speaking, the operations described above may be used to create value lists based on fields of databases stored in a number of mediums. By way of example, the databases may be stored on a disk drive, a hard drive, a floppy disk, a server computer, a remotely networked computer, etc. Accordingly, the present embodiments are to be considered as illustrative and not restrictive, and the invention is not to be limited to the details given herein, but may be modified within the scope and equivalents of the appended claims.

What is claimed is:

1. A process for generating value lists, the process comprising the operations of:

providing a first database having a plurality of fields configured to display values that are associated with predefined information types;

providing a second database having a plurality of fields containing values associated with predefined information types;

selecting one of said plurality of fields in said first database to be associated with a value list, the selected field having a particular information type, and the value list containing one or more values that are specific to the particular information type; and defining said value list to contain values from certain fields of said second database.

2. A process for generating value lists as recited in claim 1, wherein said value list is associated with an identified field of a database other than the first and second database.

3. A process for generating value lists as recited in claim 2, wherein said process further comprises:

displaying the defined value list to assist a user in selecting a value for data entry.

4. A process for generating value lists as recited in claim 3, wherein said process further comprises:

selecting a value from the defined value list being displayed.

5. A process for generating value lists as recited in claim 2, wherein said defining of said value list comprises:

identifying a first field of said second database to provide values for data entry; and identifying a second field of said second database to provide values for facilitating data entry.

6. A process for generating value lists as recited in claim 5, wherein said process further comprises:

displaying the defined value list having values from said first and second fields to assist a user in selecting a value for data entry.

7. A process for generating value lists as recited in claim 6, wherein said process further comprises:

selecting a value from the first field of the defined value list being displayed.

8. A process for generating value lists as recited in claim 1, wherein said operation of providing a first data base further includes labeling said plurality of fields to identify said predefined information types.

9. A process for generating value lists as recited in claim 8, wherein said predefined information types are selected from the group consisting essentially of text types, number types, data types, time types, calculation types, summary types and global types.

10. A process for generating value lists as recited in claim 1, wherein an update to one or more of said certain fields in said second database is automatically associated to said defined value list.

11. A process for generating value lists as recited in claim 1, wherein said fields that are associated with the predefined information types are displayed in a graphical user interface.

12. A process for generating value lists as recited in claim 1, wherein the defined value list is displayed in a graphical user interface selected from the group of a pop-up list, a pop-up menu, checkboxes, and radio buttons.

13. A process for editing value lists shared among fields in one or more databases, the process comprising the operations of:

providing a database having a plurality of fields and a plurality of value lists that have a plurality of values;

selecting at least one of said plurality of fields in said database to be associated with a given value list;

choosing one of said plurality of value lists to be the given value list; and editing the given value list while performing a data entry operation.

14. A process for editing value lists as recited in claim 13, further comprising the operation of:

setting an editing control when said at least one of said plurality of value lists are defined.

15. A process for editing value lists as recited in claim 13, wherein after being set, said editing control permits editing while performing said data entry operation.

16. A process for editing value lists as recited in claim 15, wherein said data entry operation is performed in a browse mode, or a find mode.

17. A process for editing value lists as recited in claim 15, wherein said predefined values are defined in a layout mode.

18. A computer system, comprising:

a display device;

a storage medium storing a first database having a plurality of fields containing values associated with predefined information types; and a processing unit for configuring a value list to a selected field of said first database, the value list being defined by the contents of a second database and capable of being shared with other selected fields.

19. A computer system as recited in claim 18, wherein said second database is stored on said storage medium.

20. A computer system as recited in claim 18, wherein said second database is stored on a remotely located storage medium.

21. A computer system as recited in claim 19, wherein said storage medium is selected from the group consisting of a disk drive, a hard drive, a floppy disk, a server computer, and a remotely networked computer.

22. A computer system as recited in claim 18, wherein an update to said second database is automatically associated to the value list.

23. A process for sorting fields in a database based on a value list, the process comprising the operations of:

providing a database having a plurality of fields and a plurality of value lists that have a plurality of values;

selecting at least one of said plurality of fields in said database to be sorted in a custom order based on the values of a given value list; and choosing one of said plurality of value lists to be the given value list.

24. A process for sorting fields in a database as recited in claim 23, wherein said operation of selecting at least one of said plurality of fields in said database is performed by identifying the field from a list of fields in said database.

25. A process for sorting fields in a database as recited in claim 23, further comprising the operation of defining a new value list while performing said sorting operation.

26. A process for validating data entry to a field in a database based on a value list, the process comprising the operations of:

providing a database having a plurality of fields and a plurality of value lists that have a plurality of values;

selecting at least one of said plurality of fields in said database to be validated based on the values of a given value list; and choosing one of said plurality of value lists to be the given value list.

27. A process for validating data entry as recited in claim 26, further comprising the operation of defining a new value list while performing said validation operation.

28. A computer readable media containing program instructions for generating value lists, said computer readable media comprising:

program instructions for providing a first database having a plurality of fields configured to display values that are associated with predefined information types;

program instructions for providing a second database having a plurality of fields containing values associated with predefined information types;

program instructions for selecting one of said plurality of fields in said first database to be associated with a value list, the selected field having a particular information type, and the value list containing one or more values that are specific to the particular information type; and program instructions for defining said value list to contain values from certain fields of said second database.

29. A process for generating value lists, the process comprising the operations of:

providing a database having a plurality of fields configured to display values that are associated with predefined information types;

selecting one of said plurality of fields in said database to be associated with a value list, the selected field having a particular information type, and the value list containing one or more values that are specific to the particular information type; and defining said value list to contain values from certain fields of said database.

* * * * *